US005453693A

United States Patent [19]
Sinclair et al.

[11] Patent Number: 5,453,693
[45] Date of Patent: Sep. 26, 1995

[54] LOGGING SYSTEM FOR MEASURING DIELECTRIC PROPERTIES OF FLUIDS IN A CASED WELL USING MULTIPLE MINI-WAVE GUIDES

[75] Inventors: Paul L. Sinclair, Clear Lake Shores; Shey-Min Su; Stanley C. Gianzero, both of Austin, all of Tex.

[73] Assignee: Halliburton Company, Houston, Tex.

[21] Appl. No.: 131,077

[22] Filed: Oct. 1, 1993

[51] Int. Cl.$^6$ ............................. G01V 3/18; H01Q 13/00
[52] U.S. Cl. ........................... 324/324; 343/772; 324/338
[58] Field of Search .................................. 324/324, 325, 324/337, 338, 341, 376, 637, 638, 639, 640; 333/81 R, 251; 343/719, 772, 895

[56] References Cited

U.S. PATENT DOCUMENTS

| | | | |
|---|---|---|---|
| 3,778,706 | 12/1973 | Thompson | 324/61 R |
| 3,849,721 | 11/1974 | Calvert | 324/6 |
| 4,499,418 | 2/1985 | Helms et al. | 324/58.5 A |
| 4,503,383 | 3/1985 | Agar et al. | 324/61 P |
| 4,511,843 | 4/1985 | Thoraval | 324/338 |
| 4,536,714 | 8/1985 | Clark | 324/338 |
| 4,581,584 | 4/1986 | Baldwin | 324/338 |
| 4,673,899 | 6/1987 | Jespersen et al. | 333/251 |
| 4,689,572 | 8/1987 | Clark | 324/341 |
| 4,697,190 | 9/1987 | Oswald | 324/338 |
| 4,746,867 | 5/1988 | Gunton | 324/337 |
| 4,774,680 | 9/1988 | Agar | 364/550 |

(List continued on next page.)

FOREIGN PATENT DOCUMENTS

| | | |
|---|---|---|
| 2002584 | 6/1990 | Canada . |
| 0362011A1 | 4/1990 | European Pat. Off. . |
| 0372598A2 | 6/1990 | European Pat. Off. . |
| 0508894A1 | 10/1992 | European Pat. Off. . |
| 2037439 | 7/1980 | United Kingdom ............ G01B 7/10 |
| 2227841 | 8/1990 | United Kingdom ........... G01N 27/22 |
| 2246866 | 2/1992 | United Kingdom ........... G01N 27/08 |

OTHER PUBLICATIONS

Shen, L. C. et al, Dielectric properties of reservoir rocks at ultra-high frequencies, *Geophysics*, 50:4, 692–704, Apr., 1985, place of publication unknown.

Ott, H. W., *Noise Reduction Techniques in Electronic Systems*, A Wiley–Interscience Publication, pp. 165–172, place of publication unknown.

*Well Logging*, McGraw–Hill Encyclopedia of Science & Technology, vol. 19, pp. 439–446, 7th Edition, 1992, place of publication unknown.

(List continued on next page.)

Primary Examiner—Sandra L. O'Shea
Assistant Examiner—Roger Phillips
Attorney, Agent, or Firm—Arnold, White & Durkee

[57] ABSTRACT

An improved system for measuring dielectric properties of fluids in an oil well, utilizing the well casing as a waveguide for certain electromagnetic signals. A production logging tool in accordance with the invention includes a cylindrical mandrel sheathed by a housing. Transmitting and receiving coils are contained in annular grooves defined in the mandrel. In operation, the tool is suspended by a wireline logging cable within the casing of a producing well. The transmitting coils generate magnetic fields and azimuthal electric fields, which induce voltages in the receiving coils. These voltages are affected by the dielectric properties of fluids in the casing, and the voltages may be interpreted to determine dielectric properties such as water resistivity, dielectric permittivity, water hold-up, water cut, and water salinity. Due to specifically sized longitudinal mini-waveguides defined in annular regions about the circumference of the housing, the magnetic and azimuthal electric fields resulting from the transmitting coil may be sensed by the receiving coils, but the voltage-induced electric fields created by the transmitting coil are prevented from interfering with the receiving coils. Accuracy of the invention may be enhanced by using a second transmitting coil, by spacing the coils according to specific guidelines, by operating the transmitting coils between lower-cutoff and upper-cutoff frequencies, and by using fluid mixers.

40 Claims, 8 Drawing Sheets

U.S. PATENT DOCUMENTS

| | | | |
|---|---|---|---|
| 4,862,060 | 8/1989 | Scott et al. | 324/58.5 A |
| 4,902,961 | 2/1990 | De et al. | 324/640 |
| 4,947,127 | 8/1990 | Helms et al. | 324/640 |
| 4,947,128 | 8/1990 | Hatton et al. | 324/640 |
| 4,947,129 | 8/1990 | Helms et al. | 324/640 |
| 4,974,446 | 12/1990 | Vigneaux | 73/155 |
| 4,980,642 | 12/1990 | Rodney | 324/325 |
| 4,996,489 | 2/1991 | Sinclair | 324/639 |
| 4,996,490 | 2/1991 | Scott et al. | 324/639 |
| 5,001,434 | 3/1991 | Marrelli et al. | 324/640 |
| 5,006,785 | 4/1991 | Revus et al. | 324/639 |
| 5,014,010 | 5/1991 | Helms et al. | 324/640 |
| 5,014,011 | 5/1991 | Colvin | 324/663 |
| 5,017,879 | 5/1991 | Lucas et al. | 324/663 |
| 5,059,914 | 10/1991 | Lacombe et al. | 324/637 |
| 5,083,089 | 1/1992 | Yukl | 324/632 |
| 5,132,903 | 7/1992 | Sinclair | 364/422 |
| 5,157,331 | 10/1992 | Smith | 324/338 |
| 5,210,492 | 5/1993 | Hosohara et al. | 324/220 |
| 5,329,235 | 7/1994 | Zhou et al. | 324/338 |
| 5,331,284 | 7/1994 | Jean et al. | 324/639 |
| 5,341,100 | 8/1994 | Taylor | 324/639 |

OTHER PUBLICATIONS

Chemali, R., *Feasibility Study for an Electromagnetic Water Cut Sonde*, Confidential Technical Note, Project #AAEPL10—Electromagnetic Propagation Logging–Studies and Modeling, Gearhart Industries, Inc., Austin Research Center, Jan. 19, 1987.

Quine, J. P., *Theoretical Formulas for Calculating the Shielding Effectiveness of Perforated Sheets and Wire Mesh Screens*, General Electric Company, Schenectady, New York, pp. 315–329, 1957.

Xu et al., A New Method for Measuring Watercut in Production Well, *Well Logging Technology*, vol. 16, No. 4, pp. 284–288, 1992, published in People's Republic of China (no translation is presently available).

"The Design and Development of Microwave Holdup Meter and Application in Production Logging Interpretation of Multiphase Flows", by Guo Haimin, Wu Xling, Jin Zhenwu, and Zhao Hongmin, SPE 26451, prepared for presentation at the 68th Annual Technical Conference and Exhibiton of the Society of Petroleum Engineers held in Houston, Texas, Oct. 3–6, 1983, pp. 355–364.

LOGGING SYSTEM FOR MEASURING DIELECTRIC PROPERTIES OF FLUIDS IN A CASED WELL USING MULTIPLE MINI-WAVE GUIDES

BACKGROUND OF INVENTION

1. Field of Invention

The present invention relates to downhole oil well production logging. More particularly, the invention concerns a method and apparatus for measuring dielectric properties of downhole fluids in a cased oil well such as water hold-up, water cut, and water resistivity.

2. Description of Related Art

For many reasons, most petroleum companies today are concerned with maximizing the volume of oil produced by each of their oil wells. One reason for this is that many known hydrocarbon reserves have already been depleted, and exploring for new reserves is typically expensive. Moreover, substantial costs are usually required to drill new oil wells and install the necessary production equipment. As a result, it is desirable to operate a productive oil well in a manner that produces as much oil as possible, for as long as possible.

Many techniques are presently known for maximizing the volume of oil produced by an oil well. One of these, for example, is called "production logging." Production logging generally refers to the process of lowering a "tool string" into a producing oil well that has been cased and perforated. The tool string may include a number of well known devices for performing various functions, such as perforating the well casing, sealing perforations in the well casing, pumping petroleum from the well, measuring characteristics of fluids in the well, and the like.

Geophysicists are often interested in measuring characteristics of different fluids in the well, at different depths, to determine which depths of the well are producing oil, and the rate at which they are producing. Typically, perforations are made in the well casing at different depths to permit oil to flow into the well-bore from the surrounding strata. Although it is advantageous to create these perforations at depths corresponding to oil-bearing strata, these perforations are sometimes made at depths where a mixture of oil and water is located, or where water exists alone. In some cases, perforations are made at depths that initially produce a great deal of oil but, eventually produce more and more water and less and less oil, due to depletion of the reserves at that depth. If it is determined that a certain depth of the well is non-producing, or is producing mostly saline water ("brine"), some remedial work is performed upon that depth of the well. For example, the perforations in the casing at that depth may be plugged to stop production. Then, other more productive depths of the well may continue producing. Moreover, new production may be initiated by perforating the casing at other, untapped depths of the well. Therefore, an important function of production logging is to measure the ratio of water to oil at different depths inside the well casing.

"Water hold-up" ($Y_\omega$) is defined as the ratio of water cross-sectional area ($A_\omega$) to the total area ($A$) at a given depth in a fluid flow pipe, as shown in Equation 1 (below).

$$Y_\omega = \frac{A_\omega}{A} = \frac{\int h_\omega dA}{A} \quad [1]$$

In Equation 1, $h_\omega$ is the cross-sectional area of water at a particular depth in the pipe. Accordingly, $Y_{107}$ is actually the percentage of water in the pipe, at the specified depth, at a particular instant.

In contrast, "water cut" ($C_\omega$) is defined as the amount of water produced by an oil well over a given period of time, expressed as a percentage of the total amount of fluid produced in that time period (Equation 2, below).

$$C_\omega = \frac{Q_\omega}{Q} \quad [2]$$

In Equation 2, $Q_\omega$ and $Q$ are the volumetric flow rates of water and the total fluid, respectively, inside a fluid flow pipe. Water hold-up, then, is an instantaneous value, while water cut is a measurement over time.

If the average velocities of water ($V_\omega$) and oil ($V_o$) at a given location within a flow pipe are known, the relationship between water cut ($C_\omega$) and water hold-up ($Y_\omega$) can be written as shown in Equation 3 (below).

$$C_\omega = \frac{V_\omega A_\omega}{V_\omega A_\omega + V_o(A - A_\omega)} = \frac{Y_\omega}{Y_\omega + \frac{V_o}{V_\omega}(1 - Y_\omega)} \quad [3]$$

Water hold-up and water cut are only equivalent when all fluids are flowing at the same rate. For example, in a typical oil well, water hold-up is usually greater than water cut, due to the contrasting flow rates of water and oil or gas in the well.

A number of different instruments are presently used to measure water hold-up inside a well casing. First, there is the "capacitance probe." A capacitance probe is basically a capacitor that utilizes parallel plates to evaluate the content of fluid inside a well casing by measuring the fluid's capacitance as it flows between the plates. When capacitance probes measure the capacitive impedance of an oil-water mixture, it is assumed that oil is the continuous medium and entrained droplets of water are essentially conductive inclusions.

Capacitance probes have been helpful in a number of situations. For example, when the fluid mixture comprises globules of water suspended in oil (an "oil external" mixture), the mixture is effectively an insulator, and the capacitance probe may provide useful information.

However, in certain other applications, the usefulness of the capacitance probe is limited. For example, the accuracy of the capacitance probe may be adversely impacted due to varying levels of the salinity of the water, or due to other changes in the water's conductivity. Moreover, when the fluid mixture comprises globules of oil suspended in water (a "water external" mixture), the capacitance probe is inoperative. This drawback is especially limiting, since the primary application of capacitance probes is with failing oil wells that are producing more and more water, and less and less oil.

In practice, it is difficult to predict the oil-water ratio at which a "water external" mixture occurs because so many variables are involved; for example, flow-rate, temperature, water salinity, pressure, oil density, and other variables must be considered. These variables are typically unpredictable in downhole environments. Some arrangements have used "sample chambers" to help recognize the presence of a water external mixture. With this arrangement, flowing fluids are directed into a partially enclosed volume within the logging tool where the fluids are coupled to measurement electrodes. Although this approach may be useful in some applications, it may be difficult to ensure that a representative sample will be obtained, due to the tendency of oil-water mixtures to separate in low-turbulence environments. Therefore, even with sample chambers, capacitance probes are not as accurate as some might desire.

Another approach to measure water hold-up inside a well casing utilizes a "gamma ray densitometer." Basically, a gamma ray densitometer emits gamma rays, which are subsequently measured to quantify the density of fluids in a testing chamber. Theoretically, a densitometer can be used to determine water hold-up by measuring the density of the oil-water mixture inside the well casing. This is possible since the density of water is known, the density of oil is known, and the volume of the fluid in the testing chamber is known. Although the densitometer is useful in certain applications, some may encounter limitations under specific circumstances. For example, although the density of pure water is 1 gram/cc, the density of water inside an oil well casing may be higher due to the water's salinity. Moreover, the density of oil in the casing may vary between 0.7 and 0.9 grams/cc, depending upon the composition of the hydrocarbon materials in the well. For these reasons, then, the information provided by a densitometer may not be completely accurate. "Low energy radioactive meters", another device for measuring water hold-up, also suffer from some of the same problems as densitometers since they also measure density.

Another known technique for measuring water hold-up is the "gradiomanometer." Gradiomanometers measure pressure difference over fixed lengths of fluid. Techniques utilizing gradiomanometers suffer from some of the same problems as densitometers, since gradiomanometers also measure density. A gradiomanometer is typically aligned longitudinally with the well, and functions to determine fluid density by measuring the weight of a vertical column of fluid contained in a compartment of known weight and volume. A sensitive scale located beneath the compartment makes the weight measurement. Gradiomanometers are therefore inaccurate or inoperative when used with slant wells or horizontal sections of wells, since the fluid within the gradiomanometer is not completely vertical, and hence cannot be measured accurately by the gradiomanometer's scale.

BRIEF SUMMARY OF INVENTION

The present invention concerns an improved system for measuring parameters such as water hold-up, water cut, and water resistivity in an oil well, by utilizing the well casing as a waveguide for electromagnetic signals. In an illustrative embodiment of the invention, a production logging tool is suspended on a wireline logging cable within the metal casing of a producing oil well. The production logging tool generates and measures an electromagnetic field to determine the dielectric permittivity and resistivity of fluids in the cased well. An exemplary embodiment of the production logging tool includes a long, narrow, cylindrical, metal mandrel, enclosed by a hollow cylindrical housing. Annular grooves, filled with a dielectric filler, are defined in the mandrel. A transmitting coil and two receiving coils reside in the grooves.

The production logging tool is lowered to a desired depth within the casing of a producing oil well, and then electrical current is generated in the transmitting coil. The current in the transmitting coil creates a resultant magnetic field; the voltage of the transmitting coil creates a resultant electric field, due to the impedance of the transmitting coil. Longitudinal mini-waveguides arranged about the circumference of the housing pass the magnetic field through the receiving coils, with minimal attenuation. However, the mini-waveguides sharply attenuate the electric field, preventing it from interfering with the receiving coils. The magnetic field induces voltages in the receiving coils. These voltages are affected by certain electrical characteristics of the fluids in the well casing. In accordance with the invention, the phase shift and attenuation between the induced voltages in the first and second receiving coils may be measured and analyzed to determine water hold-up, water-cut, and/or water resistivity.

A second transmitting coil may be located on the opposite side of the receiving coils relative to the first transmitting coil. The accuracy of the invention may be enhanced, for example, by operating the first and second transmitting coils alternatively, and averaging the voltages induced on each receiving coil.

The transmitting and receiving coils are spaced to avoid phase wrapping and to provide sufficient data resolution. The transmitting coils are driven with an alternating current signal having a frequency below cutoff. In one embodiment of the invention, static or dynamic mixers may be utilized to make the fluids in the well more uniform, and facilitate simultaneous measurement of water hold-up and water cut.

DESCRIPTION OF DRAWINGS

The nature, objects, and advantages of the invention will become more apparent to those skilled in the art after considering the following detailed description in connection with the accompanying drawings, in which like reference numerals designate like parts throughout, wherein.

DESCRIPTION OF A PREFERRED EMBODIMENT

Structure

Figure 1:
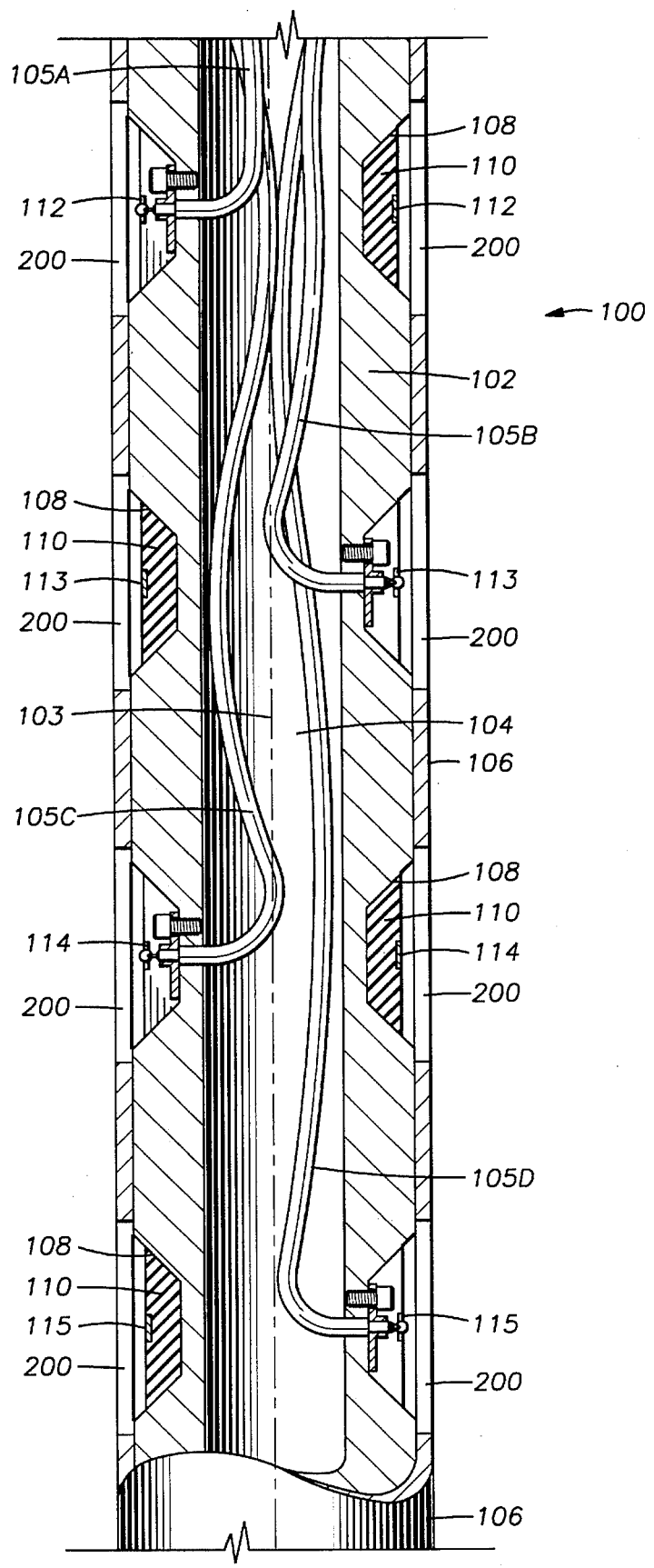
FIG. 1 is a side cross-sectional view of a production logging tool 100 of the invention.

In a preferred embodiment, the apparatus of the invention may be implemented in the form of a production logging tool 100 (FIG. 1). The tool 100, which is shaped like a long, narrow cylinder, includes a mandrel 102, having a longitudinal axis 103. The mandrel 102 is preferably made of aluminum or steel, although it may be formed from any number of other rigid materials sufficient for sturdy attachment to other tools in a logging string. It is intended that such a logging string may be lowered into a well casing (not shown) to make various measurements without disturbing the flow of fluids within the well casing. In a preferred embodiment, the mandrel 102 is about 12 inches long.

The mandrel 102 has defined therein a tubular conduit 104, to protectively house a plurality of cables 105a–105d. The cables 105a–105d preferably comprise shielded coaxial cables. The mandrel 102 is enclosed by a hollow cylindrical housing 106, which, like the mandrel 102, may be made of aluminum or steel. In a preferred embodiment the housing 106 has a diameter of $$1 - \frac{11}{16}$$

inches. In an illustrative embodiment of the invention, the housing 106 may be covered with a sheath to resist conditions of high hydrostatic pressure in which the tool 100 might be operated. The sheath may be implemented in the form of short, tubular sections, which may comprise a ceramic material, glass, epoxy, a plastic composite, or another suitable nonconductive material.

Preferably, the mandrel 102 has defined therein a number of annular grooves 108, filled with an insulating, dielectric filler 110, such as fiberglass. Residing within the grooves 108 are coils 112–115. Each coil 112–115 preferably comprises a length of copper, or another conductive material, that is looped around the mandrel 102 so that its ends (not shown) are adjacent to each other.

The coils 112–115 include a first transmitting coil 112, a first receiving coil 113, a second receiving coil 114, and a second transmitting coil 115. The transmitting coils 112, 115 are electrically connected to the cables 105a, 105d to facilitate selective generation of electrical current in the coils 112, 115. More particularly, one end (not shown) of each coil is electrically connected to the inner conductor (not shown) of its corresponding coaxial cable, and the coil's other end is electrically connected to the outer conductor (not shown) of the coaxial able. Preferably the outer conductors are grounded. Likewise, the receiving coils 113–114 are connected to the cables 105b, 105c to facilitate measurement of voltages present in the coils 113, 114.

Figure 2A:
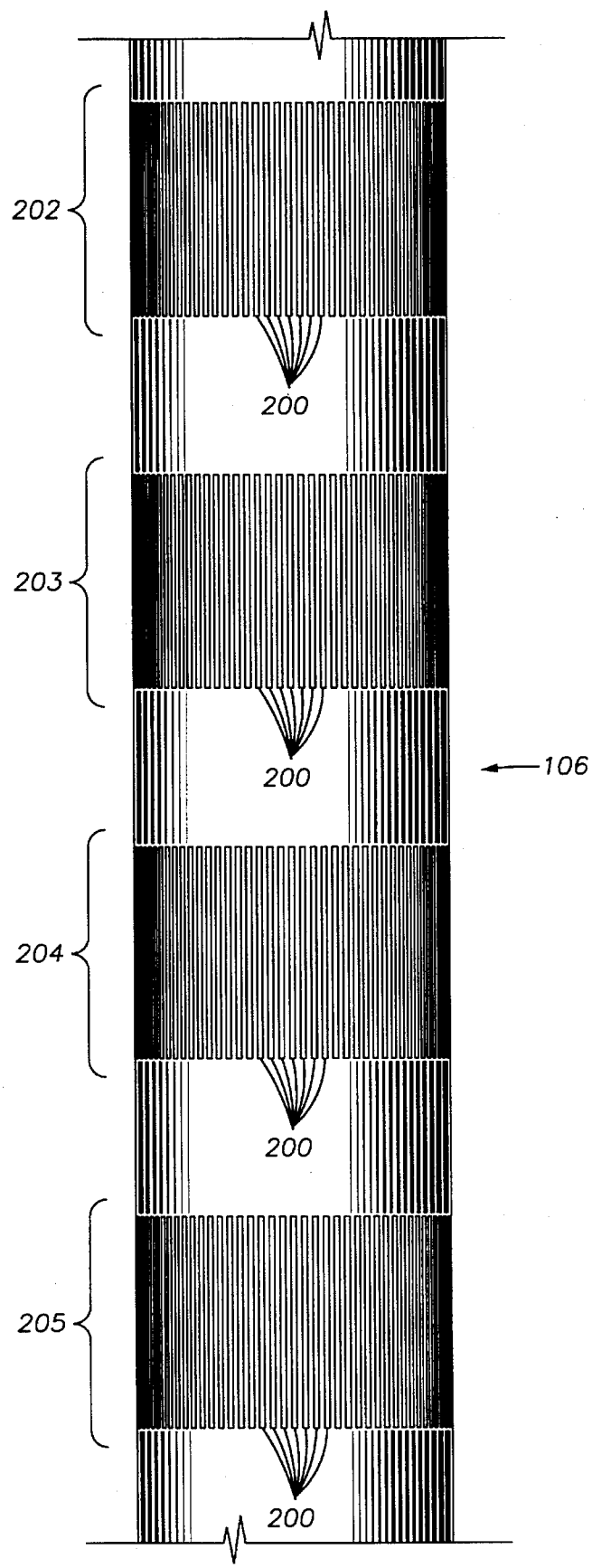
FIG. 2A is a side plan view of the production logging tool 100 of the invention, illustrating a housing 106 and annular regions 202, 203, 204, and 205 of mini-waveguides 200, in accordance with the invention.
Figure 2B:
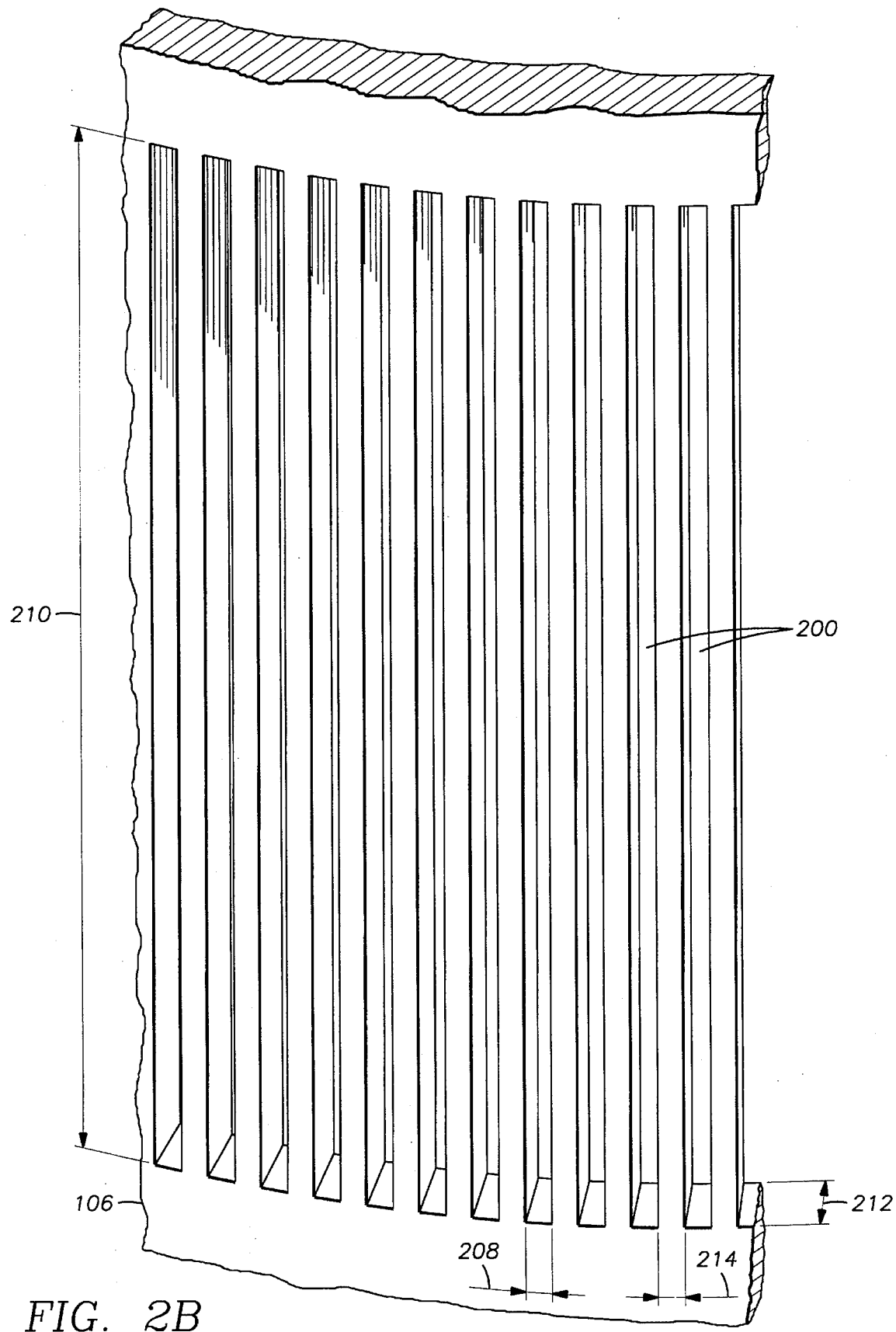
FIG. 2B is an isometric side view of mini-waveguides 200, in accordance with the invention.

The housing 106 has defined therein a plurality of narrow, longitudinal mini-waveguides 200 (FIGS. 2A–2B), arranged about the circumference of the housing 106 in multiple annular regions 202–205. Each mini-waveguide 200 has a specific width 208, length 210, and thickness 212. Moreover, each mini-waveguide 200 has a specific spacing 214 from its adjacent mini-waveguides 200. The width 208 and length 210 of the mini-waveguides 200 are determined in accordance with the present invention, as described more fully below. Each mini-waveguide 200 is filled with a dielectric filler such as fiberglass, ceramic, or another material suitable for preventing materials in the casing from contacting the mandrel 102.

Figure 3:
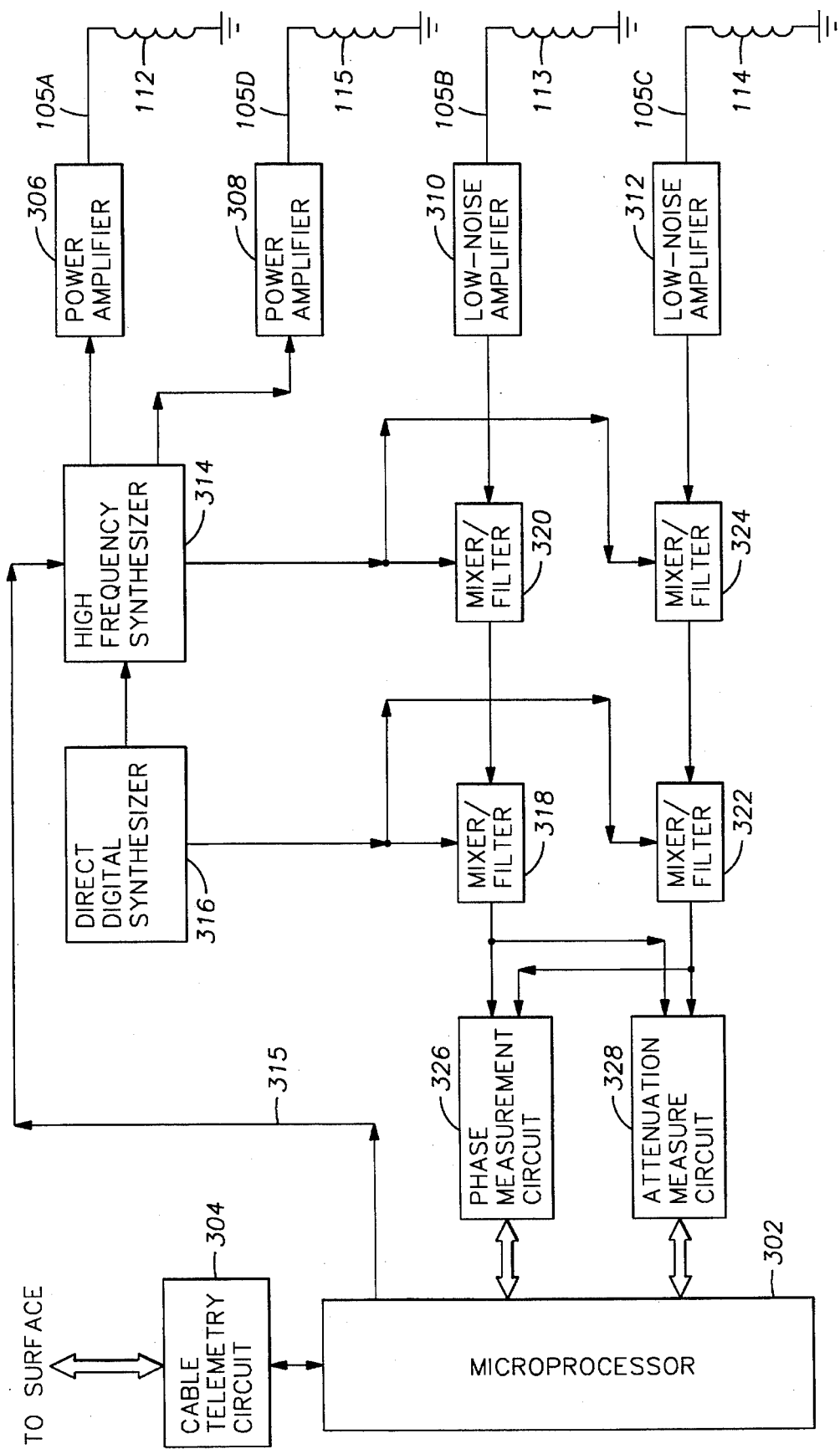
FIG. 3 is a block diagram of the electronics circuit 300 of the invention.

An electronics circuit 300 (FIG. 3) provides electrical power to the transmitting coils 112,115, and also measures voltage induced in the receiving coils 113–114. In an illustrative embodiment, the circuit 300 includes a microprocessor 302, which may comprise a Motorola model 68HC11 integrated circuit. The microprocessor 302 generally operates to coordinate the measurement of the voltages induced in the receiving coils 112–113, and to transmit data to the surface via a cable telemetry circuit 304.

Current is induced in the transmitting coils 112, 115 by power amplifiers 306 and 308. The power amplifiers 306, 308, in a preferred embodiment, comprise Hewlett Packard model MSA-1023 chips. The power amplifiers 306, 308 are electrically connected to the transmitting coils 112, 115 via the coaxial cables 105a and 105d. The receiving coils 113, 114 are electrically connected to receiver amplifiers 310, 312 via the coaxial cables 105b, 105c. The receiver amplifiers 310, 312 comprise low noise signal amplifiers, such as Hewlett Packard model INA-03184 integrated circuits.

The power amplifiers 306, 308 receive an electrical signal, preferably in the range of 200–500 MHz, from a high frequency synthesizer 314. An exemplary embodiment of the synthesizer 314 is described in U.S. patent application Ser. No. 08/043,716, filed on Apr. 8, 1993 in the name of Paul Sinclair, entitled "Digital Two Frequency Generator for Use in Borehole Heterodyne Measurement System." The synthesizer 314 may receive an input signal from the microprocessor 302 via a frequency control line 315. The synthesizer 314 may also receive input from a direct digital synthesizer 316, which may comprise circuitry also disclosed in the Ser. No. 08/043,716 application.

The circuit 300 additionally includes mixer-filters 318, 320, 322, and 324. The mixer-filters 320, 324 receive input from the synthesizer 314. In addition, the mixer-filters 320, 324 receive input from the receiver amplifiers 310, 312, respectively. The mixer-filters 318, 322 receive input from the direct digital synthesizer 316, and from the mixer-filters 320, 324. In an exemplary embodiment, the mixer-filters 320, 324 provide a 2 MHz output, and the mixer-filters 318, 322 provide a 244 Hz output. The outputs from the mixer-filters 318,322 are provided to a phase measurement circuit 326 and an attenuation measurement circuit 328. The phase measurement circuit 326 generally operates to measure the phase difference, representing phase shift, between the voltage signals detected by the two receiving coils 113–114. Similarly, the attenuation measuring circuit 328 measures the level of attenuation between the voltages induced in the two receiving coils 113–114. The circuits 326, 328 may be implemented according to knowledge that may be readily understood by an ordinarily skilled artisan having the benefit of this disclosure, and therefore will not be discussed further. The microprocessor 302 receives output from both of the circuits 326 and 328. In an alternate embodiment, the circuit 300 may be implemented using a Hewlett Packard network analyzer, such as model No. HP3577A. Moreover, the circuit 300 may also be implemented using circuitry disclosed in U.S. Pat. No. 3,849,721, which was issued on Nov. 19, 1974 to Calvert, and is hereby incorporated by reference in its entirety.

General Operation

Having described an apparatus in accordance with an exemplary embodiment of the invention, description will now be made of an illustrative method for operating the apparatus in accordance with the invention. Generally, the production logging tool 100 is lowered downhole inside the casing 400 (FIG. 4) of an oil well. The casing 400 is preferably of a cylindrical shape, a known diameter, and a conductive material. Steel casing used in oil wells today provides a sufficiently conductive material for purposes of the present invention. If desired, the tool 100 may be attached to one or more other tools (not shown), above and/or below the tool 100, to form a production logging tool string.

Figure 4:
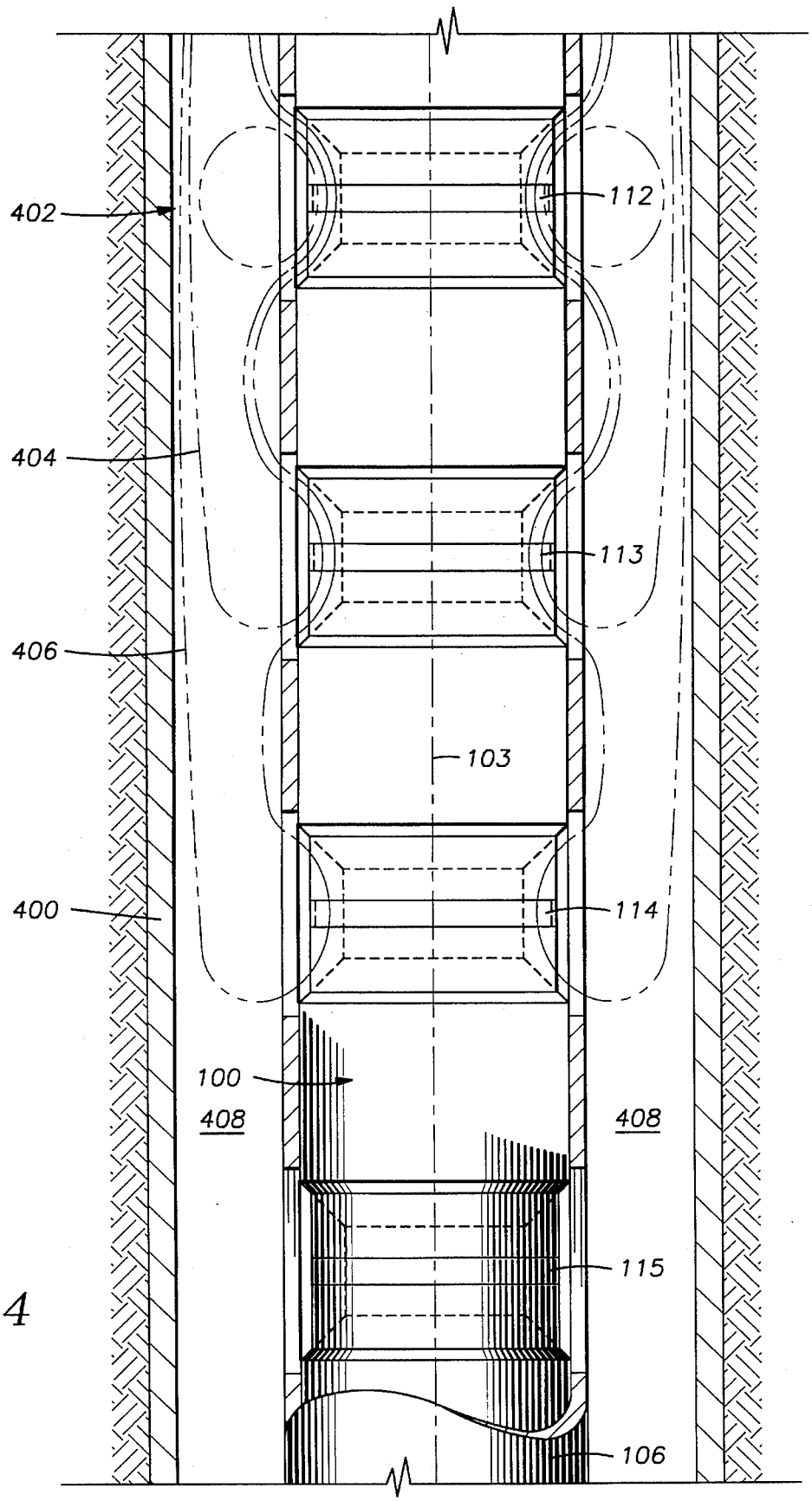
FIG. 4 is a side cross-sectional view of the production logging tool 100 of the invention, illustrating lines of magnetic flux 402 from a first transmitting coil 112.

The tool 100 is lowered to the desired depth with a wireline logging cable (not shown), and an electric signal having a certain frequency (an "excitation frequency") is applied to the transmitting coil 112 to create an "excitation current" therein. In an illustrative embodiment, the transmitting coil 112 receives power from the cable 105a, in response to signals provided by the power amplifier 306. The excitation current in the transmitting coil 112 causes a magnetic field to be generated about the coil 112. The magnetic field may be represented by concentric lines of flux 402 (FIG. 4).

Some of the outlying magnetic flux lines 402, such as the magnetic flux line 404, pass through the first receiving coil 113. Moreover, some of the further outlying magnetic flux lines 402, such as the magnetic flux line 406, pass through both the first and second receiving coils 113–114. The passage of magnetic flux through the receiving coils 113–114 induces voltages on the receiving coils 113–114. The induced voltages are affected by the electrical characteristics of the fluid 408 in the casing 400. For example, the voltage induced in the first receiving coil 113 depends in part upon the electrical characteristics of the fluid 408 in the casing 400 between the first receiving coil 113 and the first transmitting coil 112. Likewise, the voltage induced in the second receiving coil 114 depends in part upon the electrical characteristics of the fluids in the casing 400 between the second receiving coil 114 and the first transmitting coil 112.

The induced voltages also depend upon the flow of "circulating currents" in the fluid. The flow of current in the transmitting coil 112 also creates "azimuthal" electric fields which are perpendicular to the magnetic field 402. These azimuthal electric fields create "circulating currents" in the fluid 408. The circulating currents include (1) a "displacement current", which is proportional to the permittivity of the fluid 408 at some excitation frequencies, as explained below, and (2) a "conduction current" which is proportional to the conductivity of the fluid 408 at some excitation frequencies.

Due to the added distance of the second receiving coil 114 from the transmitting coil 112, however, the voltage signal induced in the second receiving coil 114 will be shifted in phase with respect to the voltage induced in the first receiving coil 113. Additionally, the voltage induced in the second receiving coil 114 will be attenuated in amplitude with respect to the voltage induced in the first receiving coil 113.

Expressing the level of voltage induced in the receiving coils 112–113 is more straightforward if the casing 400 is assumed to be a perfect conductor. It is also assumed that the excitation frequency is such that the casing behaves like the walls of a cylindrical waveguide, i.e., a device that contains and guides the propagation of electromagnetic radiation along a path defined by the physical construction of the casing 400. The complex voltages induced in the first and second receiving coils 113, 114 are shown in Equations 4–5 (below).

$$V_1 = V_{r_1} + jV_{x_1} \text{ (volts)} \quad [4]$$

$$V_2 = V_{r_2} + jV_{x_2} \text{ (volts)} \quad [5]$$

In Equations 4–5, $V_1$ and $V_2$ represent the complex voltages at the first and second receiving coils 113, 114. The phase shift ($\Delta\Phi$) and attenuation ($\Delta A$) between the signals in the first and second receiving coils 113, 114 may be calculated as shown in Equations 6–7 (below).

$$\Delta\Phi = \tan^{-1}\left(\frac{V_{x_2}}{V_{r_2}}\right) - \tan^{-1}\left(\frac{V_{x_1}}{V_{r_1}}\right) \text{(degrees)} \quad [6]$$

$$\Delta A = 10 \log\left(\frac{V_{r_1}^2 + V_{x_1}^2}{V_{r_2}^2 + V_{x_2}^2}\right) (dB) \quad [7]$$

The amount of phase shift and attenuation depends upon the content of the fluid 408 around the tool 100. As explained in greater detail below, under certain excitation frequencies, the water hold-up of the fluid 408 surrounding the tool 100 may be calculated based upon the measured phase shift and attenuation, because of the contrasting dielectric permittivities and resistivities of water and oil.

Generally, the phase shift will be greater when the fluid 408 near the tool 100 include more water; conversely, the phase shift will be less when the fluid 408 near the tool 100 include more oil. The relative dielectric permittivity of water is between 56–81 dielectric units, and the relative dielectric permittivity of oil is between 2–4 dielectric units. These values may fluctuate depending on temperature, pressure, and the water's salinity. The resistivity of formation water is about 0.01–4 $\Omega$-m, depending upon the water's salinity and the downhole temperature. The resistivity of oil is usually about $10^9$–$10^{12}$ $\Omega$-m.

The transmitting coil 115 may be operated in conjunction with the receiving coils 113–114 in a similar, but complimentary, fashion as the operation of the transmitting coil 112. The operation of the transmitting coil 115 is explained in greater detail below.

Specific Operation

The production logging tool 100 of the invention produces more valuable data when it is operated under certain conditions, or with certain characteristics. One important characteristic of the tool 100 is the spacing between the coils 112–115. If the coils 112–115 are spaced too far apart, the phase shift between the voltages on the receiving coils 113–114 may exceed 360°. This situation, called "phase wrapping," makes it more difficult to derive meaningful data from the phase shift. For example, a phase shift of 35° might be caused by fluids of a certain resistivity and dielectric permittivity, or that phase shift might actually represent a phase shift of 395° caused by fluids of a completely different resistivity and dielectric permittivity.

On the other hand, the spacing of the coils 112–115 must not be so little that the range of expected phase shifts is too small. For example, if the coils 113–114 are spaced too closely, the maximum phase shift, occurring with a mixture consisting of salt water, might only be 15°. In this case, the resolution provided by such a small range might not be as accurate as desired. Optimally, spacing between the coils 113–114 should be chosen so that the full range of expected phase shifts is slightly less than 360°. In addition, the spacing must be large enough to ensure an adequate signal-to-noise ratio. The receiving coils 113–114 are preferably spaced at a distance of less than the wavelength of the excitation frequency (i.e., the frequency of the current flowing in the first transmitting coil 112). Where coils 112–115 are conveniently sized with a diameter of 1.2 inches, the distances between the transmitting coil 112 and the receiving coils 113, 114 are preferably 2 inches and 4 inches, respectively.

Another important feature of the tool 100 concerns the electrical characteristics of the excitation current. Preferably, an alternating current (A.C.) signal is generated in the coil 112. If the excitation frequency is too low, the tool 100 will obtain information about resistivity, but will not collect any data about dielectric permittivity. As a result, the data acquired by the tool 100 will suffer from poor resolution. To obtain a desirable level of resolution, the excitation frequency is preferably sufficiently high that the casing 400 operates as an electromagnetic waveguide for electromagnetic signals generated by the transmitting coils 112, 115. More particularly, the excitation frequency is selected in accordance with the invention so that the mode of excitation is the transverse electric mode "$TE_{01}$". In addition, for the most desirable level of resolution, the excitation frequency is preferably such that the displacement and conduction currents created in the fluid 408 are nearly equal. This condition occurs at frequencies greater than a "lower-cutoff" frequency ($f_{cl}$), as indicated by Equation 8 (below).

$$f_{cl} > \frac{1}{2\pi R \epsilon_o \epsilon} \quad [8]$$

where:
R=resistivity of the fluid 408 in $\Omega$-m,
$\epsilon_o$=the permittivity of free space, i.e., $8.85 \times 10^{-12}$ F/m, and
$\epsilon$=relative permittivity of the fluid 408.

Although the most desirable results are achievable when the excitation frequency is greater than the lower-cutoff frequency, useful data may be obtained with excitation frequencies as low as 20% of the lower-cutoff frequency. Downhole, the maximum expected resistivity of the fluid 408 is about $\Omega$-m, and the maximum permittivity ($\epsilon$) is about 80 dielectric units. In this situation, the lower-cutoff frequency will be about 10 MHz.

In general, electromagnetic waveguides also have an "upper-cutoff" frequency ($f_{cu}$); below this frequency, the waveguide cannot propagate waves that carry any "real" energy. In this mode, called the "evanescent mode," waveguides can only propagate "reactive" waves that attenuate rapidly along the axis of the waveguide. Therefore, in most applications, waveguides are not operated below the upper-cutoff frequency. In accordance with the present invention, however, it is desirable to utilize an excitation frequency below upper-cutoff. Otherwise, with an excessive excitation frequency, the electromagnetic signals created by the transmitting coil 112 would propagate inside the casing 400 with little attenuation. In this case, the propagating electromagnetic signals might be reflected by discontinuities in the casing 400, resulting in unreliable or inaccurate data. Additionally, undesirable electromagnetic resonances may result in some cases, obscuring the data. Such electromagnetic resonances may introduce ambiguity, for example, by yielding data with multiple, contradictory interpretations.

When the tool 100 is centered in the casing 400, and the principal mode of excitation is the $TE_{01}$ mode as mentioned above, the upper-cutoff frequency for the transmitting coil 112 is calculated as shown in Equation 9 (below).

$$f_{cu} < \frac{3.8317}{2\pi a \sqrt{\mu \epsilon}} \quad [9]$$

where:
a=inside radius of the casing 400 in meters,
$\mu$=magnetic permeability of the fluid 408 (assumed to be 1), and
$\epsilon$=relative permittivity of the fluid 408.

Figure 5:
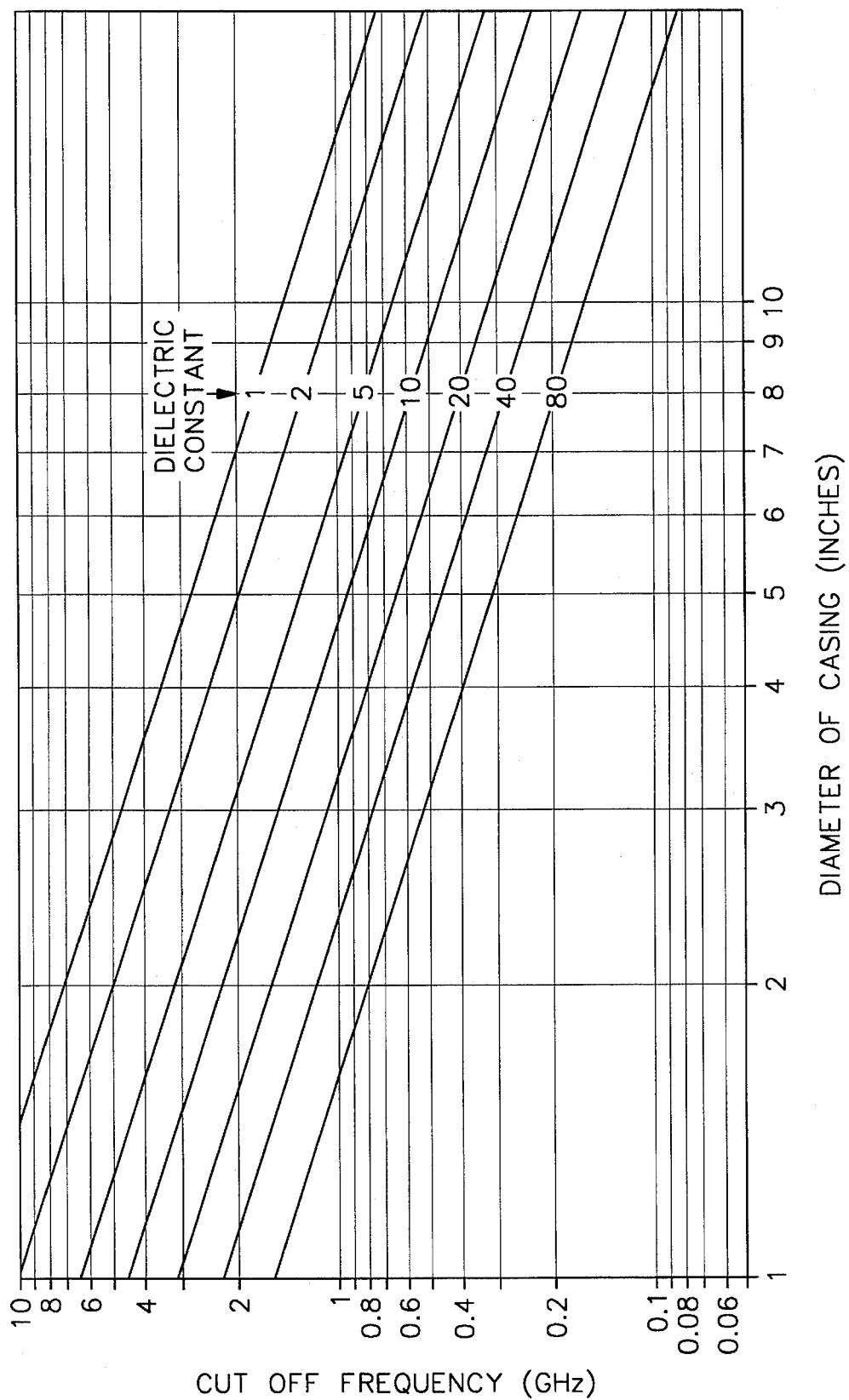
FIG. 5 is a graph illustrating the range of cutoff frequencies for various casing sizes and dielectric permittivities.

FIG. 5 illustrates the range of upper-cutoff frequencies for various casing sizes and dielectric permittivities. The lowest upper-cutoff frequency will occur when the tool 100 is completely surrounded with water, as shown in FIG. 5. Since the permittivity of water is close to 80 dielectric units, and most North American casings have a diameter of about 5 inches, the chart of FIG. 5 indicates that the lowest expected upper-cutoff frequency is about 300 MHz. Thus, to operate below upper-cutoff frequency in all cases, a frequency of less than 300 MHz should be used. However, if a larger casing size is used, a smaller operating frequency may be required, in accordance with FIG. 5.

The Second Transmitting Coil

The second transmitting coil 115, whose physical characteristics were discussed above, may be used to enhance the accuracy of the invention using a "borehole compensation technique," in accordance with the invention. In particular, the second transmitting coil 115 may be used to generate a magnetic field like that of the first transmitting coil 112, to be sensed by the receiving coils 113–114. Since the second transmitting coil 115 is located on the opposite side of the receiving coils 112–113 with respect to the first transmitting coil 112, the second transmitting coil 115 may be used to negate certain errors.

In particular, errors may be reduced by operating the first and second transmitting coils 112, 115 sequentially, and then averaging the phase shift and attenuation detected by the receiving coils 113–114. This technique is helpful to reduce errors which might arise due to any temperature-dependent impedance characteristics of the receiving coils 113–114, or any errors arising in the electronics circuit 300. In a preferred embodiment, the first and second transmitting coils 112, 115 are operated repeatedly, in rapid, alternate succession.

Determining Mini-Waveguide Size

The mini-waveguides 200 are utilized to perform a number of functions. First of all, the waveguides 200 permit the magnetic fields from the transmitting coils 112, 115 to traverse the housing 106. In addition, the waveguides 200 are sized to sharply attenuate the electric fields from the transmitting coils 112, 115, thereby minimizing their effect upon the receiving coils 113–114, in accordance with the invention.

It is desirable to couple the receiving coils 113–114 with the electromagnetic fields resulting from the flow of excitation current in the transmitting coils 112, 115. This is desirable since the level of excitation current flowing in the coils 112, 115 is known: current in the coils 112, 115 is precisely generated and monitored by the electronics circuit 300. However, due to the voltages present in each transmitting coil 112, 115, and the impedance of each coil 112, 115, strong "voltage-induced" electric fields are created. The voltage-induced electric fields are distinct from the azimuthal electric fields. The voltage-induced electric fields are undesirable for purposes of the present invention since they are capable of inducing voltages in the receiving coils 112–113 that would overwhelm the voltages induced by the magnetic fields and azimuthal electric fields.

To solve this problem, the tool 100 of the present invention utilizes mini-waveguides 200 that are arranged in annular regions 202–205, and sized according to specific requirements as described below. The mini-waveguides 200, when sized according to the invention, allow axial and radial components of the magnetic fields and azimuthal electric fields associated with the transmitting coils 112, 115 to pass through with nominal attenuation, while severely attenuating the radial and circumferential components of the voltage-induced electric fields associated with the transmitting coils 112, 115. Due to the small dimensions of the mini-waveguides 200, each mini-waveguide 200 functions like a short section of waveguide, operated well below its upper-cutoff frequency. Due to the size and placement of the mini-waveguides 200, the annular regions 202–205 prevent the coils 112–115 from exciting or sensing undesired voltage-induced electric fields. This helps to avoid potential errors in the voltage signals induced on the receiving coils 113–114. Given the desired level of attenuation of the electric ($A_e$) and magnetic ($A_m$) fields, the dimensions of the mini-waveguides 200 may be determined using Equations 10–11 (below).

$$A_e = 27.2 \frac{t}{w} \ (dB) \qquad [10]$$

$$A_m = 27.2 \frac{t}{l} \ (dB) \qquad [11]$$

Where:

t=thickness 212 of the housing 106, in inches, w=the width 208 of the mini-waveguide 200, in inches, and l=length 210 of the mini-waveguide 200, in inches.

A preferable size for each mini-waveguide is a thickness 212 of 0.093 inches, a width 208 of 0.031 inches, a spacing 214 of 0.031 inches, and a length 210 of 1.20 inches. With this arrangement, 90 mini-waveguides 200 are provided in each annular region 202–205. This arrangement has been found to yield $A_e$=81.6 dB and $A_m$=1.88 dB. Since annular regions 202–205 are provided for both transmitting and receiving coils, the attenuation is effectively doubled: $A_e$=163 dB, and $A_m$=3.77 dB. Accordingly, it is desirable to have long, thick, narrow mini-waveguides 200, since this helps to reduce the electric fields more severely than the magnetic fields. Moreover, the mini-waveguides 200 are preferably arranged longitudinally, i.e., with their length 210 parallel to the longitudinal axis 103.

With this level of attenuation, it has been found that undesired voltage-induced electric field coupling is not problematic, while the loss of the desired magnetic field and azimuthal electric field coupling is insignificant. Moreover, when the voltage-induced electric field attenuation is at least 150 dB greater than the magnetic field and azimuthal electric field attenuation, the tool 100 is able to operate accurately in the full range of downhole fluid mixtures.

Interpreting Data

Figure 6:
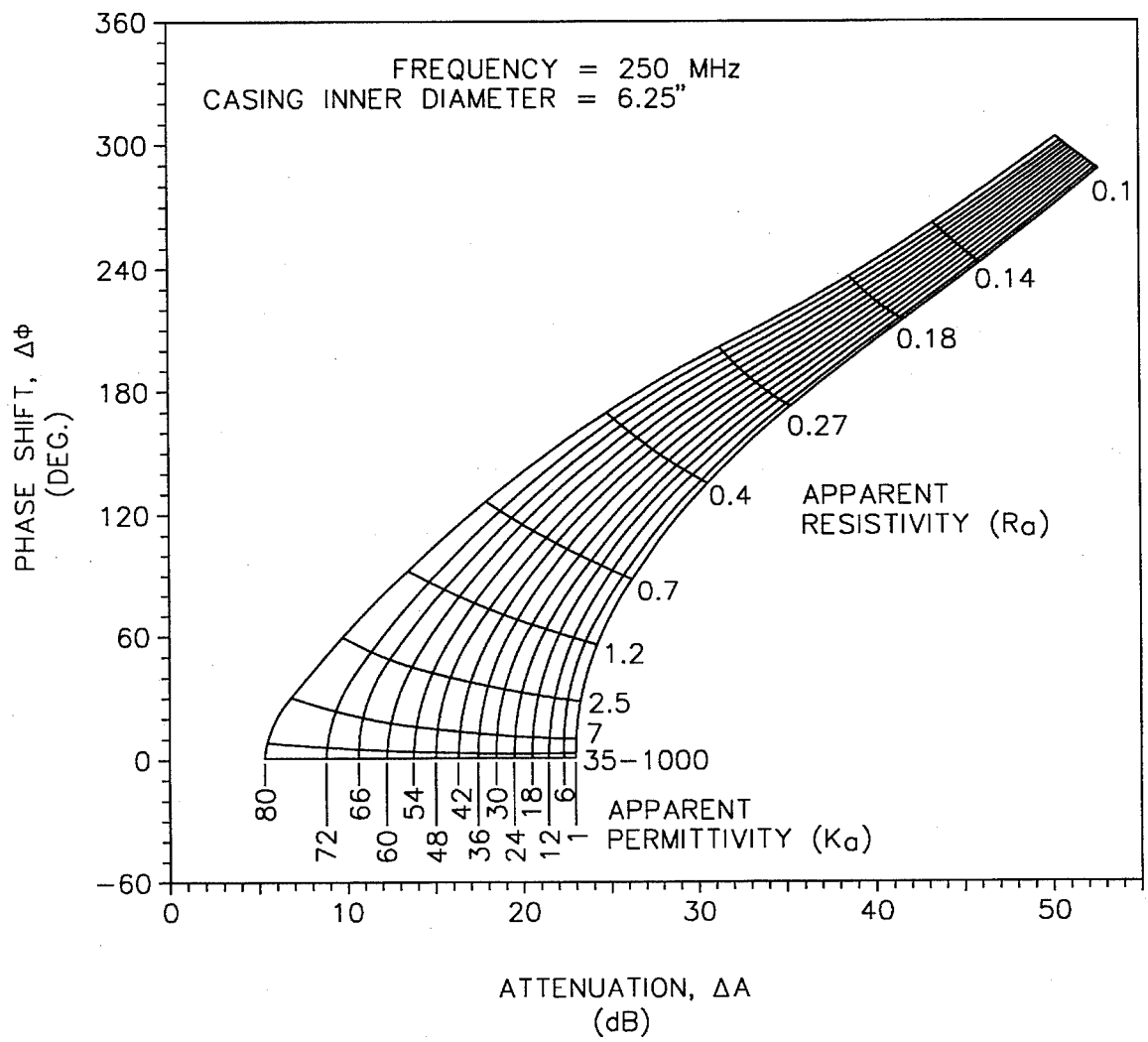
FIG. 6 is an exemplary "spider web chart", which may be constructed using actual tests or computer modeling to assist in interpreting data produced by the tool 100, in accordance with the invention.
Figure 7:
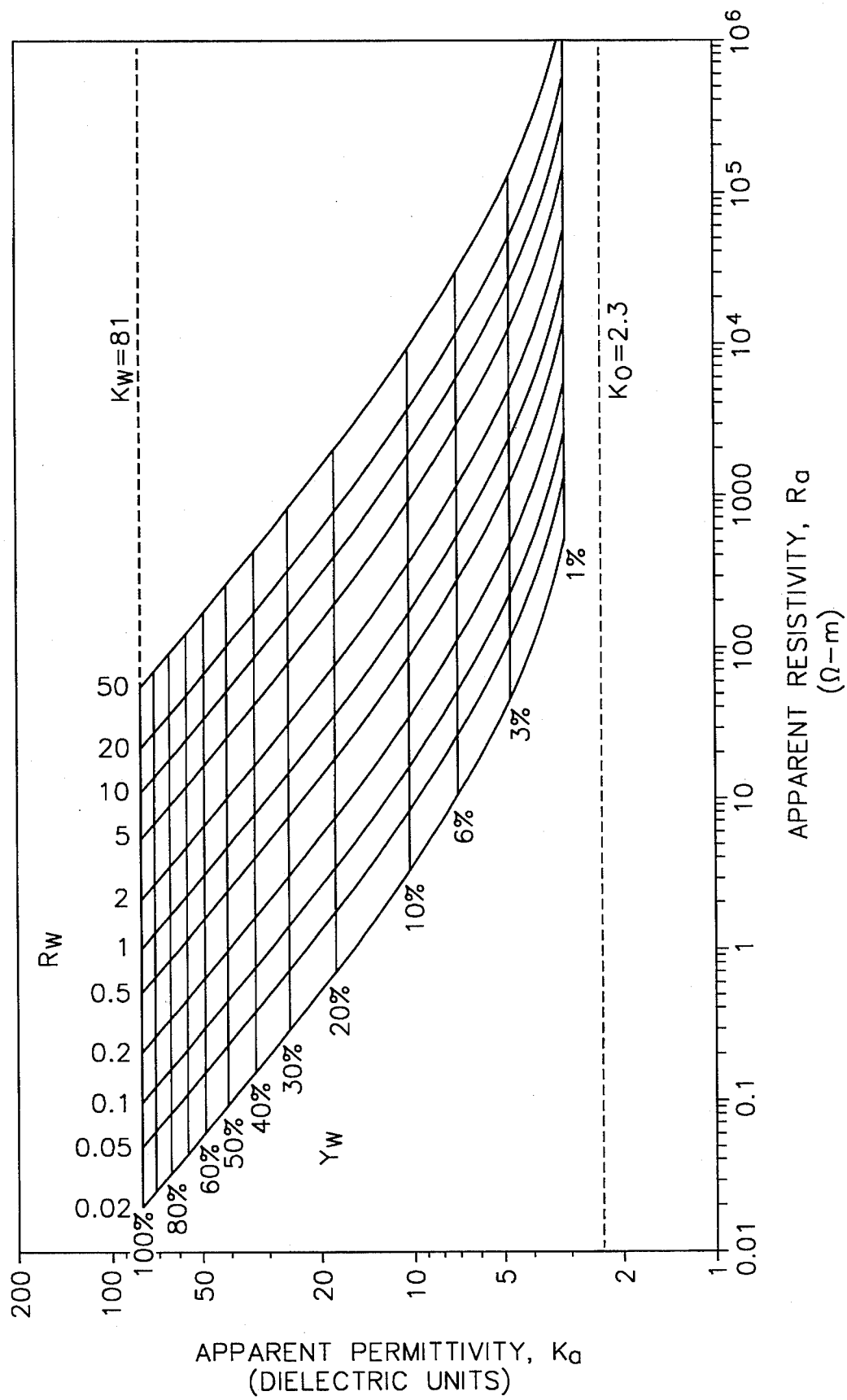
FIG. 7 is an exemplary "mixing law chart", which may be used to obtain water hold-up and water resistivity values from measured values of phase shift and attenuation, in accordance with the invention.

As mentioned above, the production logging tool 100 of the present invention measures the amplitude attenuation and the phase shift between the receiving coils 113–114. An interpretation model is needed to convert this raw data into a value of water hold-up ($Y_w$). The interpretation model may be generated using computer modeling, or by conducting actual tests of the tool 100 inside a casing 400 with different fluid mixtures. Such a model may be utilized to construct interpretative charts such as "spider web chart" and a "mixing law chart," examples of which are shown in FIGS. 6–7 respectively.

In generating interpretation models using a computer, it is useful to consider the coils 112–115 as small axially aligned magnetic dipoles, wherein a mutual inductance couples the transmitting coils 112, 115 to the receiving coils 113–114. This coupling, which occurs below the upper-cutoff frequency, is more than just a simple mutual inductance, since it is sensitive to the dielectric properties of the fluid 408 that reside in the casing 400 around the coils 112–115. If the effect of the mandrel 102 is neglected for the sake of simplicity, the voltage in the receiving coil 113 is expressed as shown in Equation 12 (below). where, $$V_R = -2\pi j \omega I_T \cdot \left(\frac{a}{b}\right)^2 \sum_{i=1}^{\infty} \frac{\mu_o}{\sqrt{k^2 - x_i}} \left[\frac{J_1\left(x_i \frac{a}{b}\right)}{J_o(x_i)}\right]^2 e^{j\left(\sqrt{k^2 - x_i}\right)L} \qquad [12]$$

$V_R$=voltage in the receiving coil 113, in volts, $I_T$=current in the transmitting coil 112, in amps, $\omega$=angular frequency of the excitation current ($2\pi \times$cycles/second), a=radius of the coils 112–115, in meters, b=radius of the casing 400, in meters, $x_i$=zeros of Bessel Function $J_1$, L=spacing between the transmitting coil 112 and the receiving coil 113, in meters, and k=complex wavenumber of the fluid 408, in meters$^{-1}$.

The complex wavenumber (k) may be defined as shown in Equation 13 (below).

$$k = \omega \sqrt{\mu_o \epsilon_o \left(\epsilon_r + \frac{j}{\omega \epsilon_o R}\right)} \qquad [13]$$

where, $\mu_o$=permeability of free space, in H/m $\epsilon_o$=permittivity of free space, F/m $\epsilon_r$=relative permittivity of the fluid 408, in dielectric units, j=$\sqrt{-1}$, and R=resistivity of fluid medium, in $\Omega$-m.

Next, Equations 12–13 (above) are repeatedly used to calculate voltages on the receiving coils 112–113 for a wide range of electrical properties of different fluid 408. The complex voltages obtained using Equations 12–13 are then converted into phase shift and attenuation values for the receiving coils 113–114 using Equations 4–7 (above). Then the computer represents the relationship between phase shift, attenuation, apparent resistivity, and apparent permittivity in the form of a "spider web chart", such as FIG. 6. Additional experiments are then conducted by varying the water's resistivity and the proportion of oil and water to establish a mixing law graph, such as FIG. 7. Additionally, the relationship shown in FIG. 7 may be represented as shown in Equation 14 (below).

$$Y_w = \frac{K_a - K_o}{K_w - K_o} = \left(\frac{R_w}{R_a}\right)^M \qquad [14]$$

where, $Y_w$=water holdup, $K_a$=apparent relative permittivity of fluids in the casing 400, in dielectric units, $K_w$=relative permittivity of water, corrected for temperature and pressure, in dielectric units, $K_o$=relative permittivity of oil, corrected for temperature and pressure, in dielectric units, $R_a$=apparent resistivity of fluids in the casing 400, Ω-m, $R_w$=the resistivity of water, in Ω-m, and M=an empirically derived exponent, about 2.2.

In Equation 14 and FIG. 7, interpolation between data points may be performed with a computer, as discussed above in relation to FIG. 6. The use and application of mixing laws is generally discussed in Shen et al, *Dielectric Properties of Reservoir Rocks at Ultra-High Frequencies*, Geophysical, Vol. 50, No. 4 (April 1985) pp. 692–704, which is hereby incorporated by reference in its entirety. Having established the relationship shown in FIG. 6 and FIG. 7, water hold-up ($Y_w$) may be established by a process known as "inversion". The process of inversion involves utilizing an interpretation model (e.g. FIG. 6) to obtain values for apparent resistivity and apparent permittivity, by plotting the phase shift and attenuation values obtained from the receiving coils 113–114. With apparent resistivity and apparent permittivity, an interpretation model (e.g. FIG. 7) may be employed for values of water hold-up ($Y_w$) and water resistivity ($R_w$).

Generally, mixing law graphs such as FIG. 7 will depend upon the electrical properties of the oil and water in the casing 400. In contrast, spider web charts such as FIG. 6 will depend upon the design of the tool 100 and the dimensions of the casing 400.

Testing

A production logging tool 100 was constructed in accordance with the invention and tested inside short lengths of steel casing. The mandrel 102, which was about 12 inches long, was sheathed inside a steel housing 106 of $$1\frac{11}{16}$$

inch diameter, equipped with annular regions 202–204. Only one transmitting coil 112 was used, spaced about 4 inches from the upper end of the mandrel 102. The first receiving coil 113 was spaced about 2 inches from the transmitting coil 112. The second receiving coil 114 was spaced 2 inches from the first receiving coil 113, 4 inches from the transmitting coil 112. Three different diameters of casing 400 were used, i.e., $$5\frac{1}{2}, 6\frac{5}{8}, \text{and } 9\frac{5}{8}$$

inches. The tool 100 inside a length of casing (not shown), was incorporated into a "flow loop" apparatus comprising a system of pumps and separator tanks to simulate a flowing oil well by circulating flows of oil and water at various rates. The water resistivity and salinity were varied by adding common salt (i.e., NaCl) to the circulating water. The measured phase shift and attenuation were interpreted using graphs such as FIGS. 6 and 7, and the results were compared to the water hold-up computed from the independently measured flow-rates of oil and water. The tool 100 was found to resolve water hold-up with an accuracy of 2–3% for a wide range of water salinities and oil-water ratios.

Conclusion

The present invention provides its users with a number of advantages. First of all, unlike prior arrangements, the invention provides highly accurate results when water hold-up is high (even 100%). Second, the invention facilitates fluid measurement across the entire bore of the casing 400, without requiring a diverter. This is especially important since some liquid mixtures tend to separate, with the heavier or more viscous portion clinging to the inside surface of the casing 400. Also, the invention provides results that are typically sensitive to small changes in the depth of the tool 100. Moreover, the invention operates in any level of water salinity, and may even be used to measure water salinity. In particular, the water resistivity, as indicated by FIG. 7, may be utilized in accordance with known formulas to yield water salinity. Such formulas, as are well known in the relevant art, depend primarily upon the value of temperature.

While there have been shown what are presently considered to be preferred embodiments of the invention, it will be apparent to those skilled in the art that various changes and modifications can be made herein without departing from the scope of the invention as defined by the appended claims.

For example, one or more mixers (not shown) may be utilized in conjunction with the invention. Such mixers may be deployed to create uniformity of the mixture in the casing 400. In the usual case, without any mixers, water hold-up and water cut may be substantially different, since water hold-up is an instantaneous measurement and water cut is measured over time. For example, water and petroleum may be flowing at different rates inside the casing 400. With a uniform mixture, however, mixers may be used to avoid any difference in water cut and water hold-up.

Additionally, mixers may be utilized to avoid measurement errors that might be introduced by bubbles that are greater than the spatial resolution of the tool 100. In practice, with low flow rates typical of a vertical borehole, oil and water will tend to separate due to the difference in density and to the fundamentally immiscible nature of the liquids. This can lead to errors in the measurement if the dimensions of the bubbles of one liquid approach the spatial resolution of the tool 100.

In one embodiment of the invention, "powered" mixers may be used. The use of mixers for fluid mixing at the surface is known, for applications such as in oil field reservoirs. Powered mixers typically utilize motor-driven propellers to mix the fluid in the reservoir. "Static" ("motionless") mixers repeatedly divide fluid flow with diverting vanes to mix flowing fluid. Although a static mixer adds no energy to the flow, it may cause a small pressure drop. Under either approach, the mixer may retract, collapse, or otherwise withdraw toward the outside of the tool string for storage.

Another embodiment of the invention is also contemplated, for use in non-conductive well casings such as fiberglass casings. In this embodiment, the housing 106 is connected to a hollow, cylindrical casing collar (not shown) having an inner cavity within which the housing 106 and mandrel 102 reside. The casing collar may be rigidly or flexibly attached to the housing in a manner sufficient to provide a cylindrical waveguide for electromagnetic signals generated by the transmitting coils 112, 115. Moreover, the outer diameter of the casing collar is slightly less than the inner diameter of the well casing, small enough to permit the casing collar to travel through the well casing without interference from any discontinuities on the well casing's inner surface. However, the casing collar's outer diameter and inner cavity are large enough to permit fluid 408 to freely pass through the casing collar, and around the housing 106.

Moreover, although the invention is said to be useful in measuring dielectric properties of oil, water, and oil-water mixtures, the term "oil" is also considered to include tar, methane, and other paraffin oils.

What is claimed is:

1. A system for measuring characteristics of materials contained in a cased well, comprising:

(a) an elongated mandrel having a longitudinal axis;

(b) a first transmitting coil mounted to the mandrel and positioned generally coaxially with respect to the longitudinal axis;

(c) a first receiving coil mounted to the mandrel and positioned generally coaxially with respect to the longitudinal axis and longitudinally spaced from said first transmitting coil;

(d) a second receiving coil mounted to the mandrel and positioned generally coaxially with respect to the longitudinal axis and longitudinally spaced from said first receiving coil;

(e) an electrically conductive housing of a selected thickness enclosing the mandrel, the first transmitting coil, the first receiving coil, and the second receiving coil, said housing including three annular regions aligned with the first transmitting coil, first receiving coil, and second receiving coil, respectively wherein each annular region includes multiple mini-waveguides of a selected length and width, wherein the length is substantially parallel to the longitudinal axis, and wherein the thickness, length and width are selected to achieve a selected maximum level of attenuation of voltage-induced electric fields of a selected frequency range while passing magnetic fields and azimuthal electric fields of the selected frequency range with a selected minimum level of attenuation.

2. The system of claim 1, wherein the first receiving coil is interposed between the first transmitting coil and the second receiving coil.

3. The system of claim 1, wherein the mandrel comprises a copper alloy.

4. The system of claim 1, wherein the mandrel comprises steel.

5. The system of claim 1, wherein the housing comprises a copper alloy.

6. The system of claim 1, wherein the housing comprises steel.

7. The system of claim 1, further including a pressure resistant non-conductive sheath enclosing the housing.

8. The system of claim 1, wherein each coil comprises copper.

9. The system of claim 1, wherein each coil includes a single turn of conductive wire.

10. The system of claim 1, further comprising a second transmitting coil mounted to the mandrel and positioned coaxially with respect to the longitudinal axis.

11. The system of claim 10, wherein the first and second receiving coils are interposed between the first and second transmitting coils.

12. The system of claim 10, wherein the housing additionally includes a fourth annular region aligned with the second transmitting coil, wherein the fourth annular region includes multiple mini-waveguides, sized to achieve a selected maximum level of attenuation of voltage-induced electric fields of a selected frequency range while passing magnetic fields and azimuthal electric fields of the selected frequency range with a selected minimum level of attenuation.

13. The system of claim 10, wherein the distance between the first transmitting coil and the first receiving coil is substantially equal to the distance between the second transmitting coil and the second receiving coil.

14. The system of claim 1, further comprising an oil well casing surrounding the housing.

15. The system of claim 1, further including electronic means for measuring voltages in the first and second receiving coils.

16. The system of claim 1, further including electronic means for generating selected electrical signals in the first and second transmitting coils.

17. A method to measure dielectric properties of materials in a cased well, comprising the steps of:

(a) lowering measuring equipment into an oil well casing, wherein the measuring equipment includes:

a supporting mandrel:

a first transmitting coil supported by said mandrel;

a first receiving coil supported by said mandrel in longitudinally space relation to said transmitting coil;

a second receiving coil supported by said mandrel in longitudinally spaced relation to said first receiving coil, and;

an electrically conductive housing generally external to said mandrel, said housing having a plurality of groups of circumferentially spaced apertures configured to serve as mini-waveguides for electromagnetic energies emitted by said first transmitter:

(b) generating an excitation current in the first transmitting coil to create a first electromagnetic field, wherein the first electromagnetic field has a frequency that is above the lower-cutoff of materials in the casing proximate the measuring equipment, and wherein the frequency is below the upper-cutoff of the casing; and (c) measuring dielectric properties of the materials by measuring first and second voltage signals induced in the first and second voltage receiving coils, respectively, by the first electromagnetic field.

18. The method of claim 17, wherein step (c) comprises a step of determining phase shift between the first and second voltage signals.

19. The method of claim 17, wherein step (c) comprises a step of determining attenuation between the first and second voltage signals.

20. The method of claim 17, wherein the dielectric properties include water hold-up.

21. The method of claim 17, wherein the dielectric properties include resistivity of water in the casing.

22. The method of claim 17, wherein the dielectric properties include water cut.

23. The method of claim 17, wherein the dielectric properties include water salinity.

24. The method of claim 17, further comprising steps of measuring phase shift and attenuation between the first and second voltage signals and utilizing the measured phase shift and attenuation to calculate water hold-up.

25. The method of claim 17, wherein the measuring equipment further includes a second transmitting coil.

26. The method of claim 25, further comprising steps of:

(d) generating an excitation current in the second transmitting coil to create a second electromagnetic field, wherein the second electromagnetic field has a frequency that is above lower-cutoff of the materials and below upper-cutoff of the casing;

(e) measuring dielectric properties of fluid in the casing by measuring third and fourth voltage signals induced in the first and-second receiving coils, respectively, by the second electromagnetic field.

27. The method of claim 26, further comprising steps of:

(a) comparing the first and second voltage signals to obtain a first comparison value;

(b) comparing the third and fourth voltage signals to obtain a second comparison value; and (c) averaging the first and second comparison values.

28. The method of claim 26, wherein the dielectric properties comprise water hold-up.

29. The method of claim 26, wherein the first and second electromagnetic fields are created at different times.

30. The method of claim 17, wherein the excitation current in the first transmitting coil has a sinusoidal waveform.

31. The method of claim 17, wherein the first receiving coil is interposed between the first transmitting coil and the second receiving coil.

32. The system of claim 25, wherein the first and second receiving coils are interposed between the first and second transmitting coils.

33. The method of claim 17, wherein the first electromagnetic field has a fixed wavelength, and the first and second receiving coils are spaced apart by a distance of less than the fixed wavelength.

34. The method of claim 25, further comprising steps of utilizing multiple mini-waveguides defined in a conductive housing of a selected thickness to minimize effects of voltage-induced electric fields from the second transmitting coil upon the first and second receiving coils.

35. The method of claim 25, wherein the distance between the first transmitting coil and the first receiving coil is substantially equal to the distance between the second transmitting coil and the second receiving coil.

36. The method of claim 17, further including a step of mixing fluids proximate the housing to increase the uniformity of said fluids.

37. The method of claim 36, wherein the mixing step is performed with one or more dynamic mixers.

38. The system of claim 37, wherein the mixing step is performed with one or more static mixers.

39. The method of claim 17, further comprising steps of utilizing said multiple mini-waveguides defined in a conductive housing of a selected thickness to minimize effects of voltage-induced electric fields from the first transmitting coil upon the first and second receiving coils.

40. The method of claim 39, wherein the mini-waveguides are arranged in annular regions in alignment with the first transmitting coil, the first receiving coil, and the second receiving coil, wherein each mini-waveguide has a length and width and the thickness, length, and width are selected to achieve a maximum level of attenuation of voltage-induced electric fields of a selected frequency range while passing magnetic fields and azimuthal electric fields of the selected frequency range with a selected minimum level of attenuation.

* * * * *

UNITED STATES PATENT AND TRADEMARK OFFICE
CERTIFICATE OF CORRECTION

PATENT NO. : 5,453,693

DATED : September 26, 1995

INVENTOR(S) : Sinclair et al.

It is certified that error appears in the above-indentified patent and that said Letters Patent is hereby corrected as shown below:

Column 2, line 6, after "Y" delete "107" and insert --$\omega$--.

Column 5, line 14, after "embodiment" insert --,--.

Column 9, line 32, insert --4-- before "$\Omega$" sign.

Column 13, line 56, insert --,-- after "100".

Column 16, line 24, delete "space" before "/relation", and insert --spaced--.

Column 18, line 13, delete "37" and insert --36--.

Column 7, line 59, delete "$V_1 = V_{r_1} + jV_{x_i}(volts)$" and insert

--$V_1 = V_{r_1} + jV_{x_1}(volts)$--.

Signed and Sealed this

Ninth Day of January, 1996

Attest:

BRUCE LEHMAN

*Attesting Officer*  *Commissioner of Patents and Trademarks*